March 29, 1960     W. A. YONKERS     2,930,944
METHOD AND APPARATUS FOR PULLING DOWN MAGNETS
Filed March 21, 1956     2 Sheets-Sheet 1
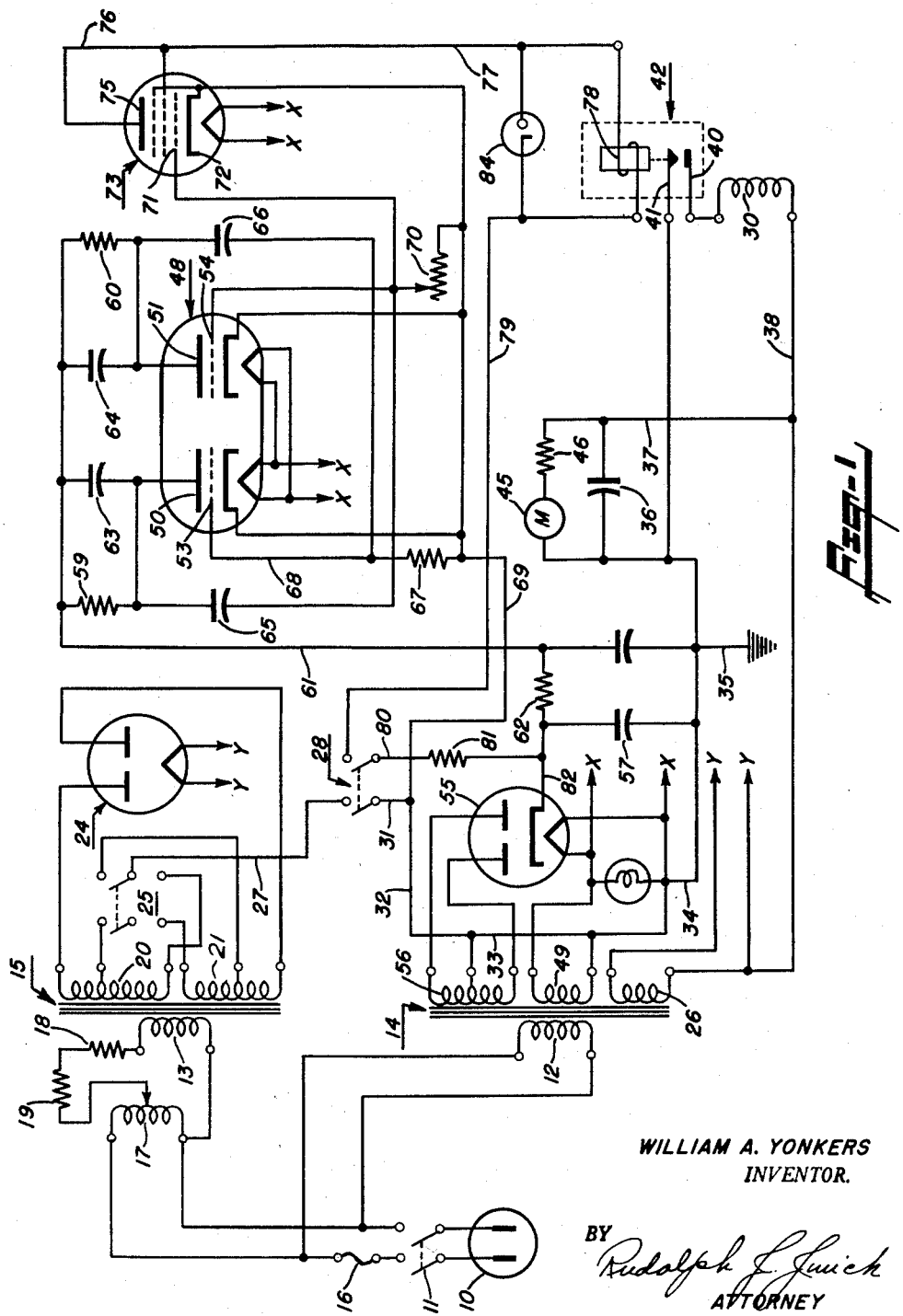
WILLIAM A. YONKERS
INVENTOR.
BY
Rudolph J. Lurich
ATTORNEY March 29, 1960    W. A. YONKERS    2,930,944
METHOD AND APPARATUS FOR PULLING DOWN MAGNETS
Filed March 21, 1956    2 Sheets-Sheet 2
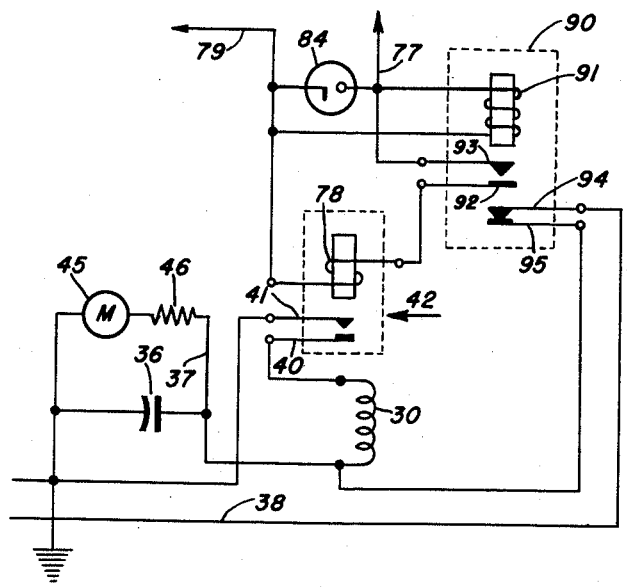
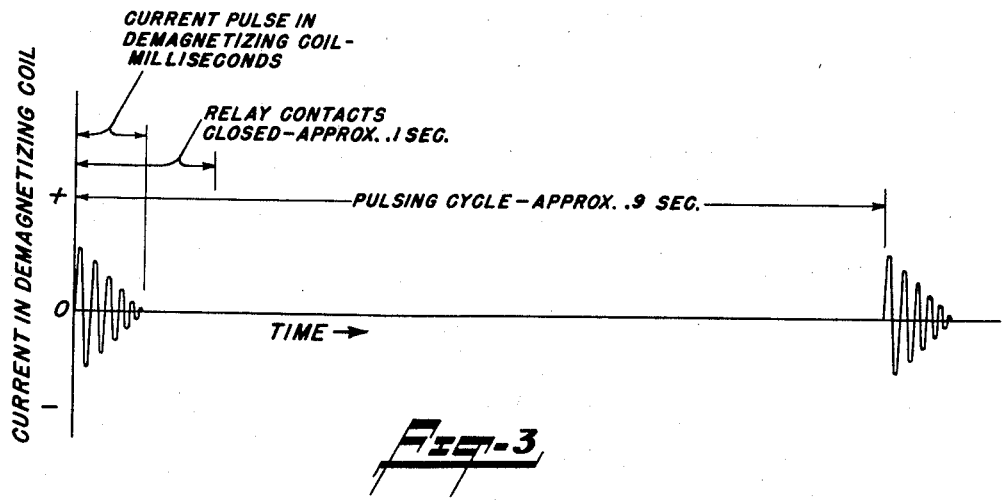
WILLIAM A. YONKERS
INVENTOR.
BY
Rudolph J. Jurick
ATTORNEY

United States Patent Office

2,930,944
Patented Mar. 29, 1960

2,930,944

METHOD AND APPARATUS FOR PULLING DOWN MAGNETS

William A. Yonkers, Mountain Lakes, N.J., assignor to Radio Frequency Laboratories, Inc., Boonton, N.J., a corporation of New Jersey Application March 21, 1956, Serial No. 572,970

3 Claims. (Cl. 317—157.5)

This invention relates to the demagnetizing of magnets and more particularly to a method and apparatus for selectively decreasing the strength of a permanent magnet.

In the manufacture of electrical devices incorporating a permanent magnet it is customary to charge the magnet fully and thereafter to subject the magnet to a demagnetizing action in order to stabilize the magnet and/or to set the strength of the magnet to a desired point. In the particular case of an electrical indicating instrument, the assembled instrument is subjected to a demagnetizing process to reduce the strength of the magnet to that value at which the instrument pointer is aligned with the top scale graduation when full scale current flows through the instrument movable coil. This process is known as pulling down a magnet and it has heretofore been effected by bringing a demagnetizing coil, traversed by a 60 cycle alternating current, into proximity to the instrument while maintaining a full scale current flow in the movable coil. As such coil is brought slowly toward the instrument the magnet is pulled down and when the pointer is aligned with the desired scale graduation the demagnetizing coil is removed.

With the newer permanent magnet materials, the demagnetizing coil must carry a relatively large alternating current thereby often resulting in a violent reaction of the instrument pointer, making it difficult to establish the precise point when the desired adjustment of the magnetic system has been obtained. My apparatus overcomes this objection by applying a series of relatively high frequency alternating current pulses to the demagnetizing coil. Each pulse has a rapidly decaying characteristic and the frequency of the pulses is relatively low, say, about 70 pulses per minute. Such pulsing energization of the demagnetizing coil makes it possible to use a relatively small coil without overheating. Further, the peak amplitude of the alternating current traversing the demagnetizing coil need be only of very short duration, in the order of milliseconds, to effect a pulling down of the magnet.

An object of this invention is the provision of a method of and apparatus for selectively adjusting the strength of a permanent magnet.

An object of this invention is the provision of magnet pull down method and apparatus which are characterized by the repetitive production of demagnetizing pulses of extremely short time duration and of decaying characteristic.

An object of the invention is the provision of apparatus for adjusting the strength of a permanent magnet comprising a demagnetizing coil, a capacitor, a source of electrical energy charging the capacitor, control means for periodically connecting the demagnetizing coil across the capacitor, and means for adjustably controlling the operation of the control means.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

Figure 1 is a circuit diagram of the apparatus;

Figure 2 is a fragmentary circuit diagram of another embodiment of the invention; and Figure 3 is a time-current chart showing the character of the current traversing the demagnetizing coil.

Referring now to Figure 1, the apparatus may be connected to a conventional 60 cycle power line that is plug-connected to the connector socket 10. Closure of the line switch 11 results in the energization of the primary windings 12 and 13, of the power transformers 14 and 15, respectively, through the protective fuse 16. However, the voltage applied to the primary transformer winding 13 is controlled by the variable transformer 17 and the values of the current limiting resistors 18, 19. The secondary winding of the transformer 15 consists of two center-tapped windings 20, 21. One end of the winding 20 is connected to one anode of the rectifier tube 24, which may be a type 5U4GB, whereas one end of the winding 21 is connected to the other tube anode. The other ends of these windings are individually connected to the lower stationary contacts of a double-pole, double-throw switch 25 and the center-tap of each winding is connected to the upper stationary contacts. In accordance with conventional practice, the filament of the tube 24 is here indicated as connected to a low voltage transformer winding by leads Y, Y, such winding being provided on the other transformer 14, and identified by the numeral 26. The purpose of the switch 25 is to selectively apply one of two available voltages to the anodes of the rectifier tube 24, as, for example, 140 and 285 volts. It will be apparent that when the switch 25 is closed in the upper position, the center taps of both of the windings 20, 21 are connected together and to the lead 27. On the other hand, when the switch is closed to the lower position, the adjacent ends of the windings 20, 21 are connected together and to the same lead 27. In the latter switch position, the adjacent ends of the windings effectively become the center point of the entire transformer secondary winding. The lead 27 is connected to a stationary contact of a double-pole, single-throw switch 28, which switch controls the application of current to the demagnetizing coil 30 as will be described in detail hereinbelow. For the present, it will be noted that the left movable blade of the switch 28 is connected to ground through the leads 31, 32, 33, 34, and 35, and also to one side of the capacitor 36. The other side of this capacitor 36 is connected to the filament of the rectifier tube 24 by the leads 37 and 38. Thus, when the double-throw switch 25 is closed to the upper position, the capacitor 36 will be charged by a rectified voltage corresponding to the relatively low voltage developed by one half of the transformer secondary windings 20, 21. Also, when the switch 25 is closed to the lower position the voltage charging the capacitor 36 will correspond to the relatively high voltage developed by the full windings 20, 21. The actual condenser-charging voltage will, of course, depend upon the voltage applied to the transformer primary winding 13 in accordance with the setting of the adjustable transformer 17. There is thus provided a simple means for selectively varying the charge of the capacitor 36 within one of two voltage ranges.

The demagnetizing coil 30 periodically is connected across the capacitor 36 upon closure of the contacts 40, 41 of the power relay 42, the latter preferably being of the mercury type. Closure of the power relay contacts results in the discharge of the capacitor 36, through the demagnetizing coil. Initially, the current through the coil 30 builds up from a zero level to a maximum peak level, depending upon the charge of the capacitor, and there is produced a corresponding magnetic flux field. Upon discharge of the capacitor, the flux field collapses thereby inducing a reverse charge in the capacitor, which then produces a reverse current flow in the coil, such reverse current having a maximum peak amplitude less than that of the initial current peak. Consequently, the current flow through the demagnetizing coil will be in the form of a damped, sine wave as shown in Figure 3, the time constant thereof depending upon the inductance of the coil. The coil is designed so that the current pulses die away to a zero level in a few milliseconds. It may here be pointed out that the power relay 42 is arranged to close its contacts at a frequency of approximately 70 cycles per minute, with the contact-closed period being only approximately 0.1 second. This affords ample time (about 0.8 second) for the capacitor to become fully charged between each cycle of contact closure, and, at the same time, permits the current flowing in the coil to decrease to a zero level.

In operation, then, the demagnetizing, or pull-down coil is placed proximate to, say, an electrical instrument incorporating a permanent magnet and having a pointer deflectable over a calibrated scale. The apparatus having been warmed up by prior closure of the line switch 11, is placed into operation by closure of the switch 28. The closure of the switch 28 sets the pulsing action into operation as will be described hereinbelow. The operator then slowly increases the voltage applied to the transformer primary coil 13, by rotating the arm of the adjustable transformer 17 from its normal, zero voltage position, thereby increasing the charge on the capacitor 36. As is well known, the strength of the instrument magnet will be decreased by an amount related to the initial peak value of the current pulses flowing in the pull-down coil, and since the periodicity of such current pulses is of the order of 0.9 second, the operator has ample time in which to note the position of the instrument pointer relative to the top mark on the scale; it being understood, of course, that a predetermined magnitude of current is passed through the instrument movable coil during the magnet pull-down operation. When the instrument pointer is aligned with the top scale mark, the demagnetizing coil is removed from the instrument and/or the apparatus pulsing action is discontinued by opening the switch 28.

The pulsing operation of the power relay 42 is controlled by the dual triode tube 48, such as a type 12AX7, and associated components and circuitry forming a free running multivibrator. The filaments of the tube 48 are energized by secondary winding 49, on the transformer 14 as indicated by the lead-end markings X—X. The other electrodes of the tube 48, specifically, the anodes 50, 51 and the control grids 53, 54 are biased by the D.-C. output voltage of the rectifier tube 55, which may be a type 6X4. The input voltages applied to the rectifier tube 55 are obtained from the relatively high voltage transformer winding 56, the ends of the winding being connected directly to the tube anodes and the center point of the winding being connected to the tube cathode through the blocking capacitor 57. The anodes 50, 51 of the tube 48, are biased by the same voltage, said anodes being connected to the cathode of the rectifier tube 55 through the respectively associated load resistors 59, 60, lead 61, and the current-limiting resistor 62. It will be noted that the load resistors 59 and 60 are shunted by the capacitors 63, 64. Further, the anode 50 is connected to the control grid 54 through the capacitor 65, whereas the anode 51 is connected to the other control grid 53 through the capacitor 66. Consequently, the tube functions as an R-C oscillator with the oscillation frequency determined by the values of the load resistors 59, 60, the shunting capacitors 63, 64 and the capacitors 65, 66. The control grid 53 is connected to ground through the fixed resistor 67, the circuit being traceable as follows; lead 68, resistor 67, and leads 69, 32, 33, 34, 35. The control grid 54 is similarly grounded, but through the adjustable resistor 70.

The adjustable voltage across the resistor 70 is applied between the control grid 71 and the cathode 72 of the electron tube 73. This tube is a beam power pentode, such as a type 6AQ5, operated as a triode by connecting the suppressor grid to the cathode and the screen grid to the anode. The anode 75 is biased by a D.-C. voltage obtained from the rectifier tube 55, the circuit being traceable as follows; leads 76, 77, operating coil 78 of the power relay 42, lead 79, switch 28 when closed, lead 80, current-limiting resistor 81 and lead 82. Oscillation of the beam power tube 48 results in a pulsing grid current flow in the adjustable resistor 70 and a correspondingly pulsating voltage applied to the control grid of the tube 73. By assigning proper constants to the resistors and capacitors associated with the tube 48, the frequency of the grid current flowing through the resistor 70 is made relatively low with the positive voltage applied to the control grid of the tube 75 being about 5% of the total time period per cycle. More specifically, with the load resistors 59 and 60 each having a value of 100,000 ohms, the capacitors 63 and 64 each having a value of .01 microfarad, and the capacitors 65, 66 respectively, having values of 1.0 and 0.05 microfarads, the pulsing frequency is approximately 70 cycles per minute with the control grid 71 biased at a positive potential for a period of approximately 3 seconds. When the control grid 71 is biased at a positive potential, current flows in the anode circuit and such current energizes the relay operating coil 78, thereby closing the relay contacts 40, 41. During the remainder of each cycle current flow in the anode circuit is cut off, the relay coil 78 is deenergized and the contacts 40, 41 remain open. When the relay contacts are open, the demagnetizing coil 30 is open-circuited and the capacitor 36 is charged by the D.-C. voltage output of the rectifier tube 24. Closure of the relay contacts connects the demagnetizing coil across such capacitor and the accompanying discharge of the capacitor results in a damped pulse of alternating current to flow through the coil, as shown in Figure 3. As explained hereinabove, the maximum peak value of each current pulse depends upon the charge of the capacitor 36, and such charge is controlled by adjustment of the adjustable transformer 17. Although the time duration of each current pulse is of the order of milliseconds, the amplitude of the first cycle of the current pulse will determine the pull-down effect upon a permanent magnet disposed within the corresponding magnetic flux field generated by the flow of current through the demagnetizing coil. Thus, by controlling the charge on the capacitor 36, as indicated by the instrument 45, the operator can pull-down a permanent magnet to a desired level. A signal lamp 84, such as a neon bulb, may be connected across the coil 78 to flash momentarily when such coil is energized.

In the Figure 1 circuit, the capacitor 36 is directly connected to the charging voltage and, consequently, a D.-C. bias current of finite magnitude will flow through the demagnetizing coil during the time period when the contacts of the power relay are closed, that is, during the period when the damped wave of condenser-discharge current flows through the coil. In the case where the Q of the demagnetizing coil becomes high (or the rate of condenser discharge current becomes small) the flow of the D.-C. bias current may be objectionable. I, therefore, prefer to interrupt the flow of charging current to the capacitor 36 during the time period when the capacitor discharges.

This is done by means of a small auxiliary relay 90 as shown in Figure 2. The operating coil 91 of the relay 90 is connected across the leads 77 and 79, whereby the operating coil is inserted into the anode circuit of the tube 73. The operating coil 78 of the relay 42 is now connected into the anode circuit of the tube 73 through the normally-open contacts 92, 93 of the auxiliary relay. A second set of normally-closed contacts 94, 95, on the auxiliary relay 90, are interposed between the lead 37, that is connected to one side of the capacitor 36 and the lead 38 that is connected to the filament of the rectifier tube 24, see also Figure 1. It will be apparent that when the contacts of the relays 42 and 90 are in the normal positions, as shown in Figure 2, the charging circuit to the capacitor 36 is closed, whereas the demagnetizing coil circuit is open. When the control grid 71 of the tube 73 is biased at a positive potential current flows through the energizing coil 91 of the auxiliary relay 90, thereby closing the relay contacts 92, 93, and opening the contacts 94, 95. The latter contacts upon such opening disconnect the capacitor 36 from the charging circuit. The closure of the contacts 92, 93 connects the energizing coil 78 of the relay 42 in parallel with the energizing coil 91, thereby resulting in a closure of the contacts 40, 41, which connects the demagnetizing coil 30 across the capacitor 36. As has been explained, hereinabove, current flows in the anode circuit of the tube 73, and through the energizing coils of the relays 42 and 90 for approximately 0.1 second, which is sufficient time to complete the discharge of the capacitor. During the remainder of the cycle, approximately 0.9 second, the energizing coils 78 and 91 are de-energized, the demagnetizing coil is open-circuited, and the capacitor 36 is charged.

Having now described the invention in detail, in accordance with the requirements of the patent statutes, what I desire to protect by Letters Patent of the United States is set forth in the following claims.

I claim:

1. The method of selectively decreasing the strength of a permanent magnet which method comprises placing a pull-down coil in fixed position proximate to the magnet; passing a series of discrete current pulses through the pull-down coil at a frequency of substantially one pulse per second, each current pulse consisting of a damped train of alternating current waves which decays to zero level within 100 milliseconds and in which the peak wave has a time duration of a few milliseconds; and adjusting the peak magnitude of the current pulses to effect a desired reduction in the strength of the magnet.

2. Apparatus for reducing the strength of a permanent magnet comprising a source of D.-C. voltage, a capacitor, manually-operable means to adjust the magnitude of the D.-C. voltage, a pull-down coil adapted to be positioned proximate to the magnet, control means operable from a first position to a second position, means applying the D.-C. voltage across the capacitor when the control means is in the first position, means disconnecting the D.-C. voltage from the capacitor and connecting the capacitor across the pull-down coil when the control means is in the second position, and means cyclically actuating the control means between the first and second positions at a rate such that the control means remains in the first position for approximately 0.9 second and in the second position for approximately 0.1 second, the constants of the capacitor and pull down coil being such that the current flowing through the pull down coil upon discharge therethrough of the capacitor decays to zero level in a few milliseconds.

3. Apparatus for reducing the strength of a permanent magnet comprising a source of D.-C. voltage, a capacitor, manually-operable means to adjust the magnitude of the D.-C. voltage, a pull-down coil adapted to be positioned proximate to the magnet, control means operable from a first to a second position, means applying the D.-C. voltage across the capacitor when the control means is in the first position, means connecting the capacitor across the pull-down coil when the control means is in the second position, automatic means cyclically actuating the control means between the first and second positions at a rate such that the control means remains in the first position for approximately 0.9 second and in the second position for approximately 0.1 second, the constants of the capacitor and pull-down coil being such that the current pulse flowing through the pull-down coil upon discharge of the capacitor therethrough decays to zero level within 0.1 second and the peak wave of each such pulse has a time duration of a few milliseconds.

References Cited in the file of this patent

UNITED STATES PATENTS

| Re. 23,217 | Snyder | Apr. 4, 1950 |
| 2,397,497 | Mages | Apr. 2, 1946 |
| 2,528,446 | McConnell | Oct. 31, 1950 |
| 2,544,366 | Strom | Mar. 6, 1951 |
| 2,620,403 | Howey | Dec. 2, 1952 |
| 2,806,186 | Brown | Sept. 10, 1957 |
| 2,810,867 | Gilbert | Oct. 22, 1957 |